US012167350B2

United States Patent
Amorim et al.

(10) Patent No.: US 12,167,350 B2
(45) Date of Patent: Dec. 10, 2024

(54) TIMING ADVANCE COMPENSATION

(71) Applicant: NOKIA TECHNOLOGIES OY, Espoo (FI)

(72) Inventors: Rafhael Amorim, Aalborg (DK); István Zsolt Kovács, Aalborg (DK); Jeroen Wigard, Klarup (DK); Zhilan Xiong, Bristol (GB); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 641 days.

(21) Appl. No.: 17/593,428

(22) PCT Filed: Mar. 29, 2019

(86) PCT No.: PCT/EP2019/057985
§ 371 (c)(1),
(2) Date: Sep. 20, 2021

(87) PCT Pub. No.: WO2020/200393
PCT Pub. Date: Oct. 8, 2020

(65) Prior Publication Data
US 2022/0167289 A1 May 26, 2022

(51) Int. Cl.
*H04W 56/00* (2009.01)

(52) U.S. Cl.
CPC .............................. *H04W 56/001* (2013.01)

(58) Field of Classification Search
CPC .............. H04W 56/001; H04W 56/0045; H04B 7/18504; H04B 7/1851
See application file for complete search history.

(56) References Cited

U.S. PATENT DOCUMENTS

| 2014/0086161 A1* | 3/2014 | Cai ................... H04W 56/0045 370/329 |
| 2014/0328309 A1* | 11/2014 | Comstock ........... H04W 72/541 370/329 |

OTHER PUBLICATIONS

International Search Report and Written Opinion for International Application No. PCT/EP2019/057985, mailed on Dec. 17, 2019, 12 pages.

(Continued)

*Primary Examiner* — Fred A Casca
(74) *Attorney, Agent, or Firm* — Robert P. Michal, Esq.; Carter, DeLuca & Farrell LLP

(57) ABSTRACT

Devices, methods and computer programs for timing advance variation compensation in wireless communications are disclosed Timing advance variation for a client device communicating with a network node device at least partially via an air/space born vehicle communication connection is determined based on measurements on uplink signaling from the client device. A timing advance compensation function curve from a set of predetermined timing advance compensation function curves is selected, such that the selected timing advance compensation function curve corresponds with the determined timing advance variation. An indication of the selected timing advance compensation function curve is signaled to the client device.

9 Claims, 12 Drawing Sheets

(56) References Cited

OTHER PUBLICATIONS

3GPP TSG-RAN WG1 #96, R1-1901721; "Positioning in NTN"; Source: Nokia, Nokia Shanghai Bell; Agenda item: 7.3; Athens, Greece; Feb. 25-Mar. 1, 2019, 6 pages.
3GPP TR 38.811, V15.0.0; "3rd Generation Partnership Project; Technical Specification Group Radio Access Network; Study on New Radio (NR) to Support Non Terrestrial Networks (Release 15)"; Jun. 2018, 118 pages.

* cited by examiner

| Subcarrier spacing (SCS) configuration parameter, $\mu$ | SCS [kHz] | Tstep [ns] | Max step size [µs] | Minimum number of MAC CE commands required within a sec | |
|---|---|---|---|---|---|
| | | | | @ 2*20 µs/sec drift | @ 2*40 µs/sec drift |
| 0 | 15 | 520.83 | 16.67 | 3 | 5 |
| 1 | 30 | 260.42 | 8.33 | 5 | 10 |
| 2 | 60 | 130.21 | 4.17 | 10 | 19 |
| 3 | 120 | 65.10 | 2.08 | 19 | 38 |
| 4 | 240 | 32.55 | 1.04 | 39 | 77 |

| UE Index | dist measured at t=0 [km] | $\Delta dist$ after t=1 s. [m] | Round Trip Time Variation [microseconds] |
|---|---|---|---|
| A | 1,847.4 | 6725.8 | 44.8 |
| B | 1,847.4 | -6725.8 | -44.8 |
| C | 1,847.4 | 13.4 | 0.09 |
| D | 1,847.4 | 13.4 | 0.09 |

TIMING ADVANCE COMPENSATION

CROSS-REFERENCE TO RELATED APPLICATIONS

This application is a national stage entry of International Application No. PCT/EP2019/057985, filed Mar. 29, 2019, entitled "TIMING ADVANCE COMPENSATION" which is hereby incorporated by reference in its entirety.

TECHNICAL FIELD

The present application generally relates to the field of wireless communications. In particular, the present application relates to a client device and a network node device for wireless communication, and a related methods and a computer programs.

BACKGROUND

A network node device may transmit timing advance (TA) commands to a client device in order to align the uplink (UL) transmissions to the downlink (DL) transmissions timing at the network node device. The TA is used to compensate for the propagation delay between the client device and the network node device. TA allows the UL subframe to be aligned with the DL subframe in the network node device even when some client devices experience different propagation delays.

SUMMARY

An embodiment of a network node device for cellular communication comprises at least one processor and at least one memory including computer program code. The at least one memory and the computer program code are configured to, with the at least one processor, cause the network node device to at least perform:

determining timing advance variation for at least one client device communicating with the network node device at least partially via an air/space born vehicle communication connection, based on at least one measurement on uplink signaling from the at least one client device;

selecting a timing advance compensation function curve from a set of predetermined timing advance compensation function curves, such that the selected timing advance compensation function curve corresponds with the determined timing advance variation; and signaling an indication of the selected timing advance compensation function curve to the at least one client device.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the indication of the selected timing advance compensation function curve is signaled in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the network node device is configured to store the set of predetermined timing advance compensation function curves.

An embodiment of a network node device for cellular communication comprises means for performing:

determining timing advance variation for at least one client device communicating with the network node device at least partially via an air/space born vehicle communication connection, based on at least one measurement on uplink signaling from the at least one client device;

selecting a timing advance compensation function curve from a set of predetermined timing advance compensation function curves, such that the selected timing advance compensation function curve corresponds with the determined timing advance variation; and signaling an indication of the selected timing advance compensation function curve to the at least one client device.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the indication of the selected timing advance compensation function curve is signaled in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the means are configured to store the set of predetermined timing advance compensation function curves.

An embodiment of a method of timing advance variation compensation comprises:
  determining, by a network node device for cellular communication communicating with at least one client device at least partially via an air/space born vehicle communication connection, timing advance variation for the at least one client device based on at least one measurement on uplink signaling from the at least one client device;
  selecting, by the network node device, a timing advance compensation function curve from a set of predetermined timing advance compensation function curves, such that the selected timing advance compensation function curve corresponds with the determined timing advance variation; and
  signaling, by the network node device, an indication of the selected timing advance compensation function curve to the at least one client device.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the indication of the selected timing advance compensation function curve is signaled in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the method further comprises storing the set of predetermined timing advance compensation function curves.

An embodiment of a computer program product comprises program code configured to perform the method according to any of the above network node device related embodiments, when the computer program product is executed on a computer.

An embodiment of a client device for cellular communication comprises at least one processor and at least one memory including computer program code. The at least one memory and the computer program code are configured to, with the at least one processor, cause the client device to at least perform:
  receiving, from a network node device communicating with the client device at least partially via an air/space born vehicle communication connection, an indication of a timing advance compensation function curve;
  accessing the indicated timing advance compensation function curve in a set of predetermined timing advance compensation function curves; and
  determining a timing advance variation compensation based on the accessed timing advance compensation function curve.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the received indication of the selected timing advance compensation function curve is signaled from the network node device in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the client device is configured to store the set of predetermined timing advance compensation function curves.

An embodiment of a client device for cellular communication comprises means for performing:
  receiving, from a network node device communicating with the client device at least partially via an air/space born vehicle communication connection, an indication of a timing advance compensation function curve;
  accessing the indicated timing advance compensation function curve in a set of predetermined timing advance compensation function curves; and
  determining a timing advance variation compensation based on the accessed timing advance compensation function curve.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the received indication of the selected timing advance compensation function curve is signaled from the network node device in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the means are configured to store the set of predetermined timing advance compensation function curves.

An embodiment of a method of timing advance variation compensation comprises:
  receiving, at a client device for cellular communication communicating with a network node device at least partially via an air/space born vehicle communication connection, an indication of a timing advance compensation function curve from the network node device;
  accessing, by the client device, the indicated timing advance compensation function curve in a set of predetermined timing advance compensation function curves; and
  determining, by the client device, a timing advance variation compensation based on the accessed timing advance compensation function curve.

In an embodiment, alternatively or in addition to the above-described embodiments, each timing advance compensation function curve in the set of predetermined timing advance compensation function curves has an associated unique index, and the indication of the selected timing advance compensation function curve comprises the index of the selected timing advance compensation function curve.

In an embodiment, alternatively or in addition to the above-described embodiments, the indication of the selected timing advance compensation function curve further comprises an indication of a starting point on the selected timing advance compensation function.

In an embodiment, alternatively or in addition to the above-described embodiments, the indication of the selected timing advance compensation function curve further comprises an indication of a start time instant for applying the selected timing advance compensation function curve.

In an embodiment, alternatively or in addition to the above-described embodiments, the indication of the selected timing advance compensation function curve further comprises an indication of a timing advance compensation function input step size to use for the selected timing advance compensation function curve.

In an embodiment, alternatively or in addition to the above-described embodiments, the indication of the selected timing advance compensation function curve further comprises an indication of a time period for updating one timing advance compensation function input step.

In an embodiment, alternatively or in addition to the above-described embodiments, each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

In an embodiment, alternatively or in addition to the above-described embodiments, the received indication of the selected timing advance compensation function curve is signaled from the network node device in a cell broadcast message, a random access response message, or a radio resource control message.

In an embodiment, alternatively or in addition to the above-described embodiments, the starting point on the selected timing advance compensation function is based on client position information, a cell beam position, or past timing advance variation compensations.

In an embodiment, alternatively or in addition to the above-described embodiments, the method further comprises storing the set of predetermined timing advance compensation function curves.

An embodiment of a computer program product comprises program code configured to perform the method according to any of the above client device related embodiments, when the computer program product is executed on a computer.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1A:
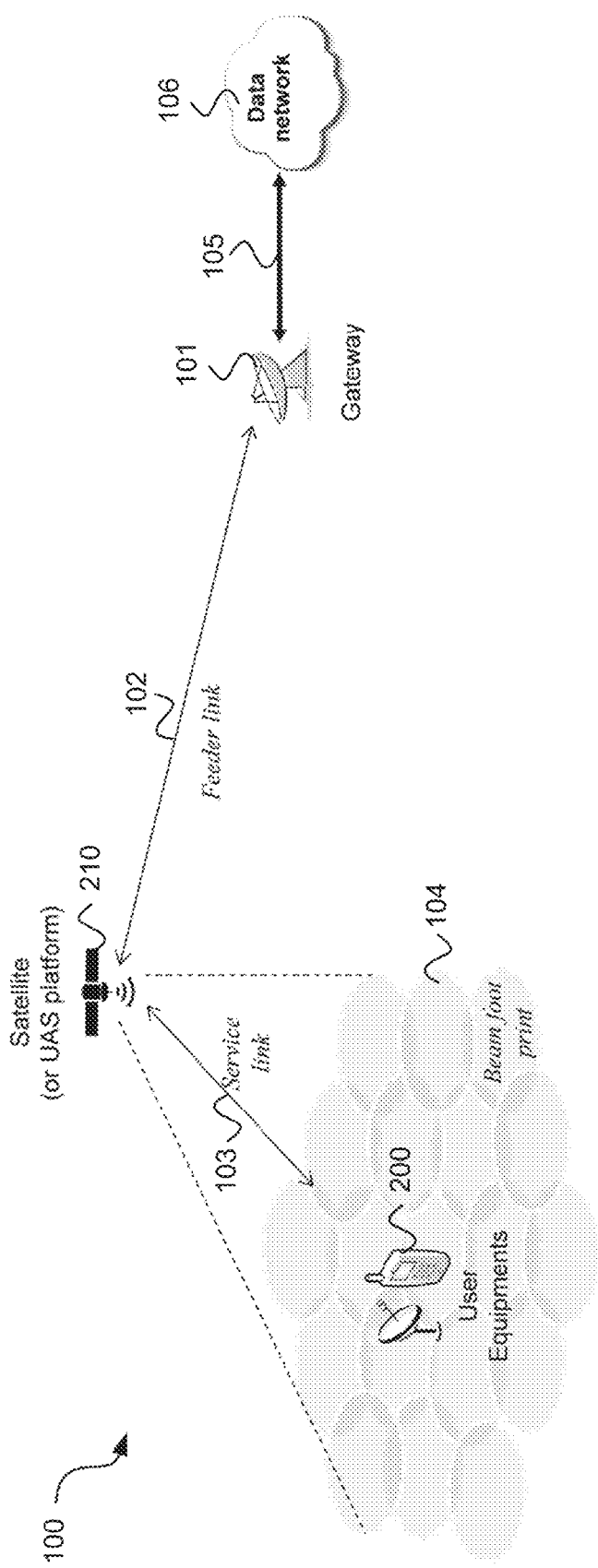
FIG. 1A shows an example embodiment of the subject matter described herein illustrating an example system, where various embodiments of the present disclosure may be implemented.

FIG. 1A illustrates an example system 100, where various embodiments of the present disclosure may be implemented. The system 100 may comprise a non-terrestrial network (NTN). An example representation of the system 100 is shown depicting a client device 200, a network node device 210, a gateway 101, as well as a data network 106. The network node device 210 may correspond to or be included in a satellite. The network node device 210 may communicate with the gateway 101 via a feeder link 102. There may be a link connection 105 between the gateway 101 and data network 106. The network node device 210 may access the data network 106 via the feeder link 102, the gateway 101, and/or the link connection 105 between the gateway 101 and the data network 106.

The client device 200 may include e.g. a mobile phone, a smartphone, a tablet computer, a smart watch, or any handheld or portable device. The client device 200 may also be referred to as a user equipment (UE). The client device 200 may communicate with the network node device 210 via e.g. an air/space born vehicle communication connection 103, such as a service link.

It may be desirable to enable various network technologies, such as 5G new radio (NR), to support the usage of NTN within the context of cellular networks. NTNs may be able to provide seamless coverage on remote areas, such as deserts, islands and open ocean, and/or in disaster situations, or the like, by utilizing satellites as the base station or gNB in 5G networks.

The network node device 200 may send timing advance (TA) commands to the client device 200 to align uplink (UL) transmissions to downlink (DL) transmissions timing at the network node device 210. The TA may be used to compensate for the propagation delay T between the client device 200 and the network node device 210.

In LTE and 5G NR, the TA adjustment steps by the network and commands/signaling may be specified, for example, by two mechanisms. First, the initial TA adjustment may be performed in a random access response (RAR) command. Second, subsequent TA adjustments/updates may be performed with MAC (medium access control) commands (MAC CE (control element)). The TA ranges which can be compensated by these two mechanisms may be different and are designed to cover scenarios with typical terrestrial networks coverage propagation delays. While these schemes can be used for NTN, this may however lead to a very high number of MAC CE commands to be signaled by a NTN network node device 210 to all of its served client devices 200.

There are various scenarios to be considered for the NTN. In a geostationary (GEO) scenario, the satellites are static from the Earth's perspective. Therefore, their relative positions for client devices 200 on the ground do not change. However, in low-earth orbit (LEO) scenarios, where satellites are positioned at altitudes between 600-1200 kilometers (km) from the Earth's surface, the satellites can be moving at high speeds from the Earth's perspective.

At 600 km height, the LEO satellites are moving at 7.5 km/second with orbital periods as low as approximately 90 minutes. This causes the distance between satellite and users on the Earth's surface to vary rapidly. Likewise, propagation delays can also vary considerably more than in terrestrial networks. Thus, this movement of the satellite can cause a high drift or variation in the TA within a short period of time. In the 600 km case, the delay drift can be as high as +/−20 microseconds per second (μs/sec) for a regenerative payload scenario or +/−40 μs/sec for a transparent payload observed from a static client device 200 on the ground. The TA adjustment commands may have to compensate for twice the differential delay.

In some arrangements, the initial TA compensation may be addressed using differential delay signaling (e.g. via broadcast) combined with initial TA compensation steps adapted to large propagation delays (e.g. by scaling of currently specified step values by a factor of 2, 4, 8, etc.). Some embodiments described herein may be used for the required subsequent adjustments of the TA with MAC CE commands.

After the initial TA compensation in the RAR command, the TA update commands, signaled with MAC CE, may indicate how much the client device 200 TA has to be corrected from its current reference value. The update may follow the equation:

$$TA\_new = TA\_old + (T_A - 31) \cdot (16 \cdot 64 \cdot Tc)/2^\mu,$$

where TA_old is the old value for the timing advance, Tc is the time unit for the NR technology (approximately 0.509 ns) and $2^\mu$ is the subcarrier spacing (SCS) factor defined by:

$$2^\mu = SCS[Hz]/(15 \cdot 10^3).$$

The $T_A = 0, 1, \ldots, 63$ index value can be indicated e.g. in the TA update command transmitted by the network node device 210 in a MAC CE command.

Figures 1B, 1C:
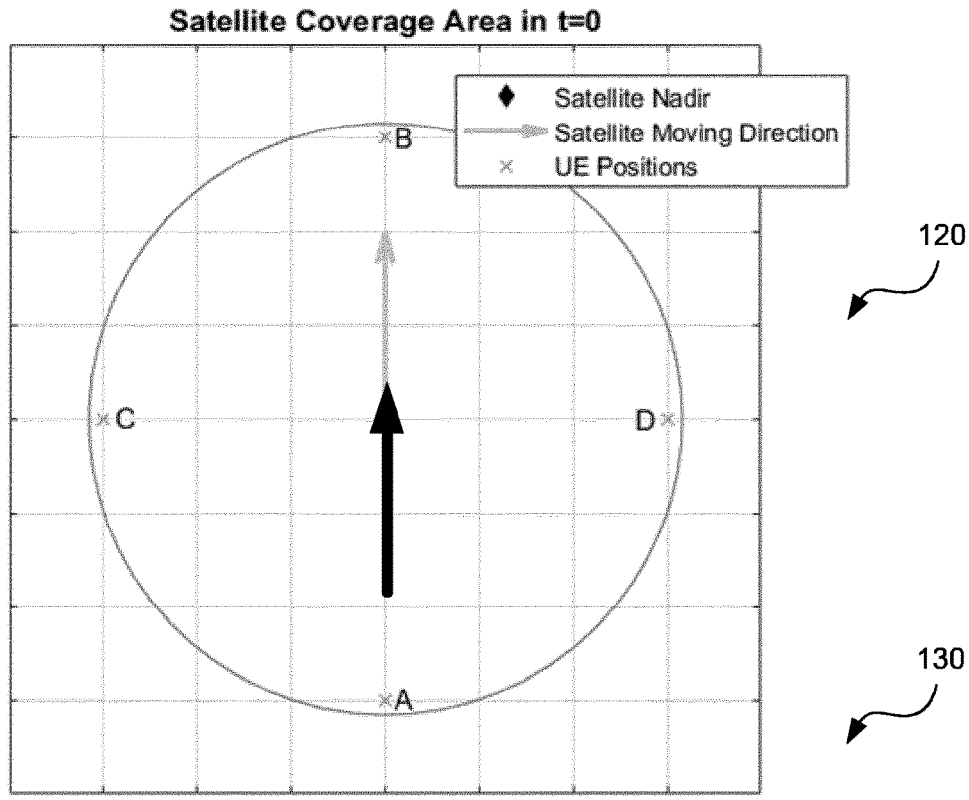
FIG. 1B shows the effect of subcarrier spacing on TA adjustment steps in some arrangements.
FIG. 1C shows an example embodiment of the subject matter described herein illustrating of drift rates experienced by different users in some arrangements.

Table 110 in FIG. 1B illustrates the effect of subcarrier spacing on the TA adjustment steps. At the higher subcarrier spacings—which are expected to be deployed in the high frequencies used in NTN—the TA adjustment steps decreases, in terms of absolute time. Thus, the number of required TA commands can increase significantly to be able to compensate for the +/−20 ρs/sec to +/−40 ρs/sec drift. The "Max step size" is (63−31)*Tstep. Assuming several users may be served within a cell coverage area, this may lead to significant DL signaling capacity loss in the network just for sending the required frequent MAC CEs to all users.

FIG. 10 illustrates examples of drift rates experienced by different users, for a satellite at 600 km altitude. An additional challenge is that the drift rate is not the same observed for every user in the area of coverage of a given satellite beam. This can be observed from FIG. 10. Diagram 120 in FIG. 10 shows different client device locations (A, B, C and D), located close to the edge of the maximum satellite beam coverage area (up to 1932 km for a LEO satellite at 600 km altitude). The table 130 in FIG. 10 shows the current distance, dist, measured between these points and the satellite at t=0 and the Mist measured at t=1 sec (with the satellite moving along the direction indicated in FIG. 10), as well as round-trip time variation. The position of the users affects the drift rate (up to three orders of magnitude), despite all the client device points being at the same distance from the satellite at t=0.

Some embodiments described herein may address the problem of large and varying propagation in NTN LEO deployments, specifically in terms of the large and varying number of Time Advance commands sent via MAC CE and the related control overhead.

At least in some of the embodiments, the network node device 210 may perform small payload signaling that may allow the client device 200 to compensate the TA drift or variation perceived in a number of TA steps. Other TA procedures may be run on top of this.

Figure 2A:
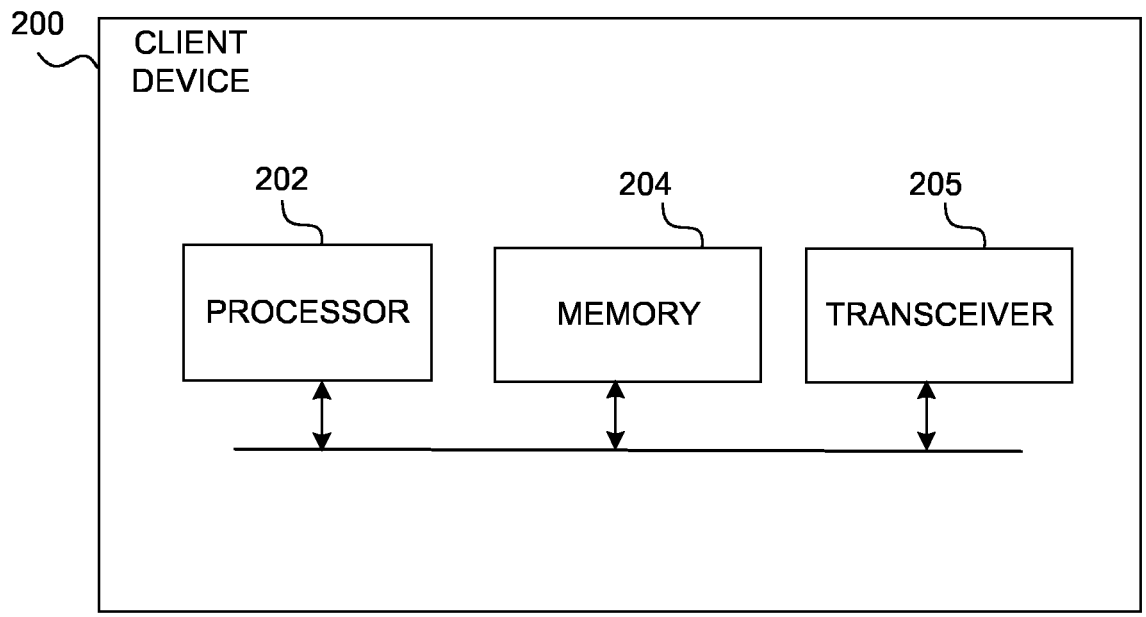
FIG. 2A shows an example embodiment of the subject matter described herein illustrating a client device.
Figure 2B:
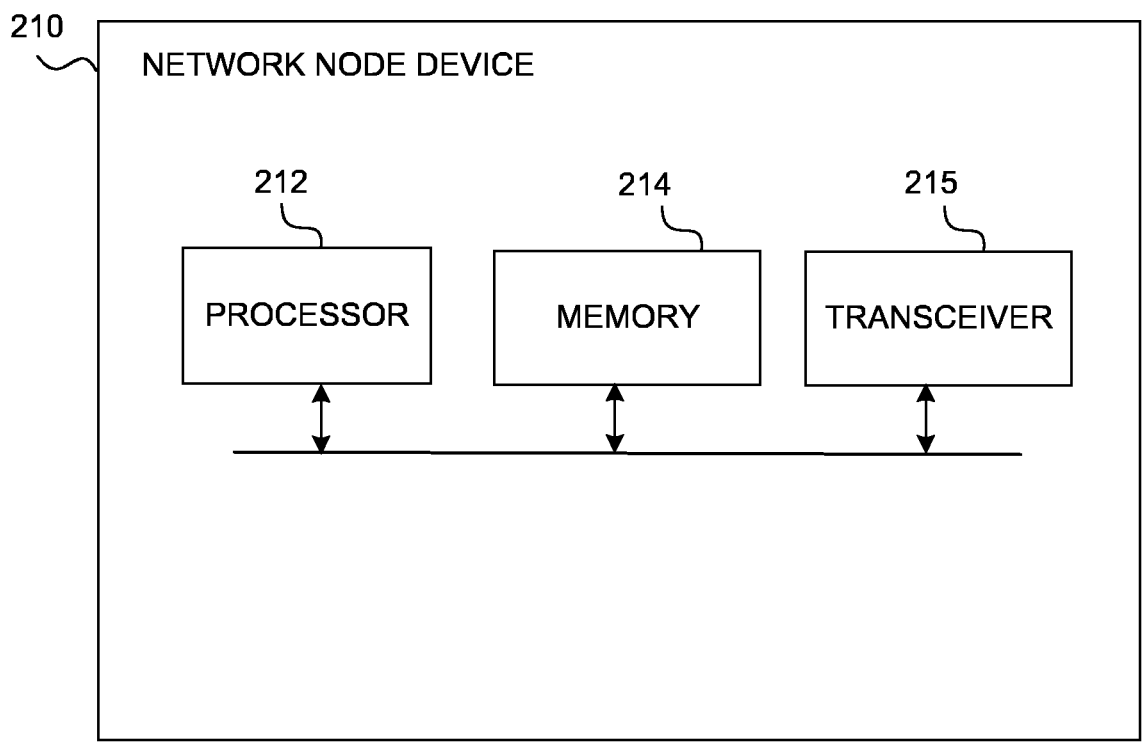
FIG. 2B shows an example embodiment of the subject matter described herein illustrating a network node device.

FIG. 2B is a block diagram of a network node device 210 for cellular communication, in accordance with an example embodiment.

The network node device 210 comprises one or more processors 212, and one or more memories 214 that comprise computer program code. The network node device 210 may also include a transceiver 215, as well as other elements, such as an input/output module (not shown in FIG. 2B), and/or a communication interface (not shown in FIG. 2B).

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used e.g. to store at least some of the timing advance compensation function curves used the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The network node device 210 may be a base station. The base station may include e.g. a fifth-generation base station (gNB) or any such device suitable for implementation in a satellite and providing an air interface for client devices to connect to the wireless network via wireless transmissions.

The at least one memory 214 and the computer program code are configured to, with the at least one processor 212, cause the network node device 210 to perform determining timing advance variation for at least one client device 200 communicating with the network node device 210 at least partially via an air/space born vehicle communication connection 103, based on at least one measurement on uplink signaling from the at least one client device 200. Herein, the air/space born vehicle communication connection 103 may comprise at least one of a satellite communication connection or a high-altitude platform station (HAPS) communication connection. A HAPS communication connection is also known as a high-altitude pseudo-satellite communication connection.

The at least one memory 214 and the computer program code are further to, with the at least one processor 212, cause the network node device 210 to perform selecting a timing advance compensation function curve from a set of predetermined timing advance compensation function curves, such that the selected timing advance compensation function curve corresponds with the determined timing advance variation. In other words, the network node device 210 may perform a selection of a set of TA variation or drift compensation function curves to be used for e.g. a given client device 200, multiple client devices 200 in a cell, or multiple client devices 200 in a beam.

The network node device 210 may be configured to store the set of predetermined timing advance compensation function curves, e.g. in the memory 214.

For example, each timing advance compensation function used in the set of predetermined timing advance compensation function curves may be a function of: an orbit of the air/space born vehicle communication connection, and a distance between a position area (or area of possible positions) of the at least one client device and a beam trajectory of the air/space born vehicle communication connection on the ground. The position area of the at least one client device may include e.g. one or more of a reported position, an estimated position or an estimated area of possible positions of the at least one client device.

For example, each timing advance compensation function curve in the set of predetermined timing advance compensation function curves may have an associated unique index, and the indication of the selected timing advance compensation function curve may comprise the index of the selected timing advance compensation function curve. In other words, the network node device 210 may perform a provisioning of a drift or variation compensation function index, C_idx 320, to the client device 200. This will point to the client device 200 the TA variation compensation function curve to use.

Alternatively or additionally, the indication of the selected timing advance compensation function curve may further comprise an indication of a starting point on the selected timing advance compensation function. For example, the starting point on the selected timing advance compensation function may be based on client position information (e.g. reported or estimated client position information), a beam position or a cell beam position, or past timing advance variation compensations. In other words, the network node device 210 may perform a provisioning of a starting point, U_idx 321, in the function indicated by the C_idx 320 to the client device 200. Optionally, the client device 200 may use its own position information, together with the satellite ephemeris, to determine the starting point, U_idx, in the drift or variation compensation function.

Alternatively or additionally, the indication of the selected timing advance compensation function curve may further comprise an indication of a start time instant for applying the selected timing advance compensation function curve. In other words, the indication may include the instant from which the compensation should be applied by the client device 200 (such as from the reception of the indication, from a given subframe, from a grant command, or the like).

Alternatively or additionally, the indication of the selected timing advance compensation function curve may further comprise an indication of a timing advance compensation function input step size to use for the selected timing advance compensation function curve. It is to be understood that the timing advance compensation function input step size may be positive or negative. Alternatively or additionally, the indication of the selected timing advance compensation function curve may further comprise an indication of a time period for updating one timing advance compensation function input step. In other words, the network node device 210 may perform a provisioning of the TA step size (i.e. timing advance compensation function input step size) to the client device 200, indicating to the client device 200 how fast it should move through the function in time. The TA step size may determine the number of steps in the U_idx scale to be updated by the client device 200 in a given period of time. Alternatively, the network node device 210 may provide the period of time to update one step in the U_idx scale.

The at least one memory 214 and the computer program code are further configured to, with the at least one processor 212, cause the network node device 210 to perform signaling (e.g. by using the transceiver 215) an indication of the selected timing advance compensation function curve to the at least one client device 200. For example, the indication of the selected timing advance compensation function curve may be signaled in a cell broadcast message, a random access response message, or a radio resource control message (including e.g. a handover message).

FIG. 2A is a block diagram of a client device 200 for cellular communication, in accordance with an example embodiment.

The client device 200 comprises one or more processors 202, and one or more memories 204 that comprise computer program code. The client device 200 may also include a transceiver 205, as well as other elements, such as an input/output module (not shown in FIG. 2A), and/or a communication interface (not shown in FIG. 2A).

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used e.g. to store at least some of the timing advance compensation function curves used the disclosed embodiments. The timing advance compensation function curves used by the client device 200 may be the same ones as the timing advance compensation function curves used by the network node device 210.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices, etc.

The at least one memory 204 and the computer program code are configured to, with the at least one processor 202, cause the client device 200 to perform receiving, from the network node device 210 communicating with the client device 200 at least partially via the air/space born vehicle communication connection 103, the indication of the timing advance compensation function curve. In other words, the client device 200 may perform reception (e.g. in RRC_CONNECTED mode) of the C_idx signaled by the serving network node device 210, the C_idx mapping to one of the TA variation compensation function curves. Furthermore, the client device 200 may perform reception (e.g. in RRC_CONNECTED mode) of the indication of the starting point in the selected TA function. Furthermore, the client device 200 may perform reception (e.g. in RRC_CONNECTED mode) of the indication of the TA step size to use on the selected TA variation compensation function curve.

The at least one memory 204 and the computer program code are further configured to, with the at least one processor 202, cause the client device 200 to perform accessing the indicated timing advance compensation function curve in a set of predetermined timing advance compensation function curves. The client device 200 may be configured to store the set of predetermined timing advance compensation function curves, e.g. in the memory 204.

The at least one memory 204 and the computer program code are further configured to, with the at least one processor 202, cause the client device 200 to perform determining a timing advance variation compensation based on the accessed timing advance compensation function curve. In other words, the client device 200 may perform using of the TA functions, C_idx index, starting point and TA step size to determine the TA.

Further features (such as those related to the timing advance compensation function curves and the indication of the selected timing advance compensation function curve) of the client device 200 directly result from the functionalities and parameters of the network node device 210 and thus are not repeated here.

It is to be understood that in the embodiments of FIGS. 2A and 2B, instead of applying the TA variation compensation function curve, the starting point and TA step size can be applied per a group of client devices, such as all the client devices in one 5G beam or cell.

Furthermore, the index C_idx conveyed by the network node device 210 may refer to a subset of a larger dictionary (i.e. a set of parameters of the TA variation compensation function). In this case, the network node device 210 may provide (e.g. in broadcast channels) the subset of TA variation compensation function curves in use from the larger dictionary. The index C_idx later conveyed to the client device 200 then refers to this subset of TA variation compensation function curves. This implementation may reduce the number of bits required to contain the dictionary and thus the number of bits to transfer from the network node device 210 to a client device 200.

In some situations, large dictionaries may be available, including, for example, TA variation compensation function curves for several satellite heights. In such situations, the satellite-based network node device 210 may e.g. choose the subset of functions that is related to its own height.

In some embodiments, different 5G beams within the same 5G cell may be related to different TA variation compensation function curves.

Figure 3:
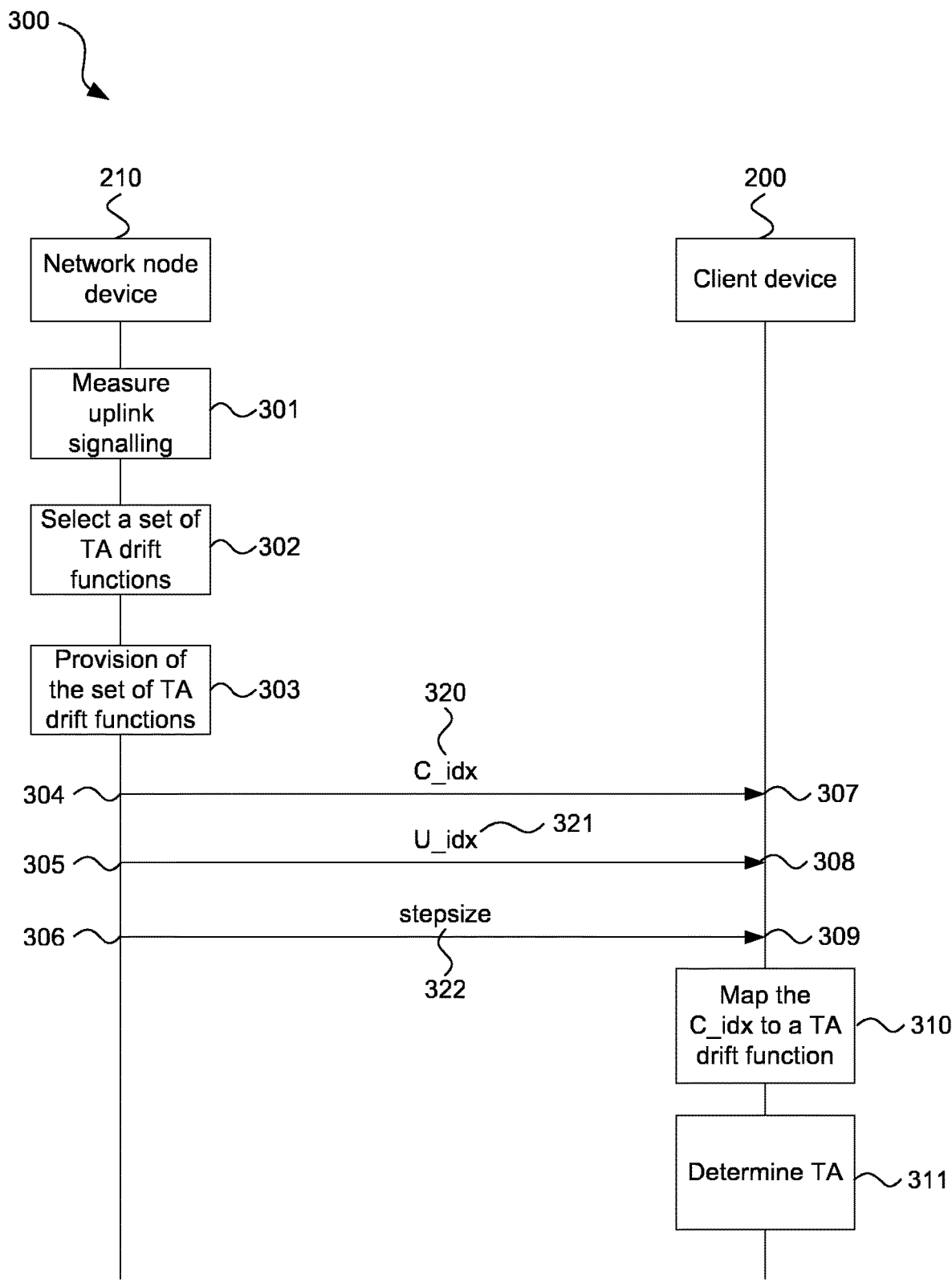
FIG. 3 shows an example embodiment of the subject matter described herein illustrating a signaling diagram.

FIG. 3 illustrates an example signaling diagram of a method 300 of timing advance variation compensation, in accordance with an example embodiment.

In operation 301, the network node device 210 for cellular communication communicating with at least one client device 200 at least partially via an air/space born vehicle communication connection performs at least one measurement on uplink signaling from the at least one client device 200, and determines timing advance variation for the at least one client device 200 based on the at least one measurement.

In operation 302, the network node device 210 selects a timing advance compensation function curve from a set of predetermined timing advance compensation function curves, such that the selected timing advance compensation function curve corresponds with the determined timing advance variation.

In optional operation 303, the network node device 210 the network node device 210 may perform provisioning of the set of operation 302 to the client device 200.

In operations 304 to 306, the network node device 210 signals an indication of the selected timing advance compensation function curve to the at least one client device 200. For example, the indication may comprise the index 320 of the selected timing advance compensation function curve, as described in more detail in connection with FIG. 2B. This index 320 of the selected timing advance compensation function curve may be sent e.g. in operation 304. Furthermore, the indication may further comprise an indication 321 of a starting point on the selected timing advance compensation function, or an indication of a start time instant for applying the selected timing advance compensation function curve. Either of these indications may be sent e.g. in operation 305. Furthermore, the indication may further comprise an indication 322 of a timing advance step size to use for the selected timing advance compensation function, or an indication of a time period for updating one timing advance step. Either of these indications may be sent e.g. in operation 306.

In operations 307, 308, 309 (corresponding to operations 304, 305, 306, respectively), the client device 200 receives the indication of the timing advance compensation function curve from the network node device 210.

In operation 310, the client device 200 accesses the indicated timing advance compensation function curve in a stored set of predetermined timing advance compensation function curves.

In operation 311, the client device 200 determines the timing advance variation compensation based on the accessed timing advance compensation function curve.

It is to be understood that the order in which operations 304-310 are performed, may vary from the example depicted in FIG. 3.

The method 300 may be performed by the network node device 210 of FIG. 2B and the client device 200 of FIG. 2A. Further features of the method 300 directly result from the functionalities and parameters of the network node device 210 and the client device 200 and thus are not repeated here. The method 300 can be performed by computer program(s).

Figure 4:
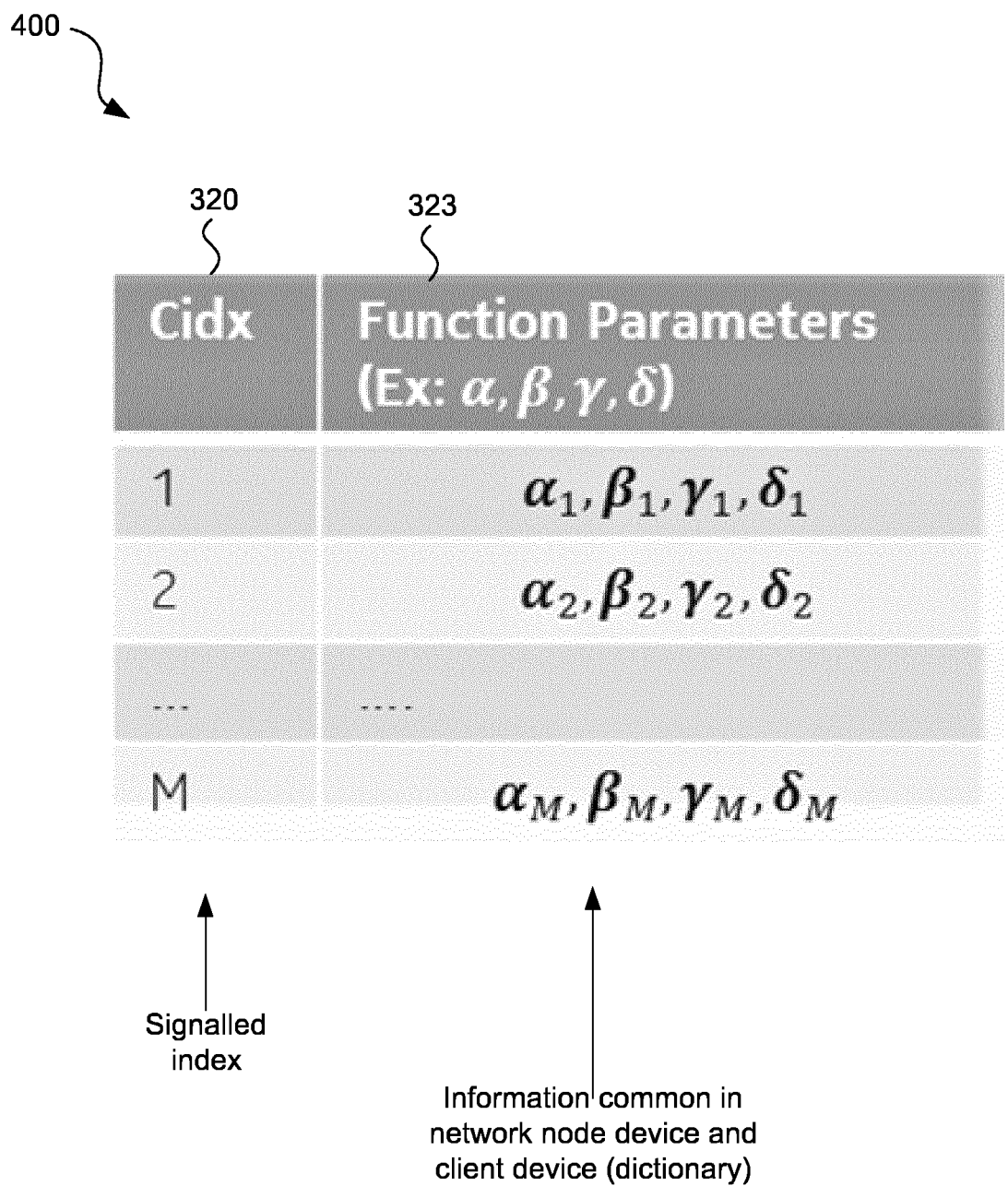
FIG. 4 shows an example embodiment of the subject matter described herein illustrating a dictionary.

FIG. 4 illustrates an example embodiment of a dictionary (i.e. a set of parameters of the TA variation compensation function) 400. Using the dictionary 400, the client device 200 can deduce the parameters 323 to be used for the TA variation compensation function curve based on the C_idx 320 received from the network node device 210.

Figure 5:
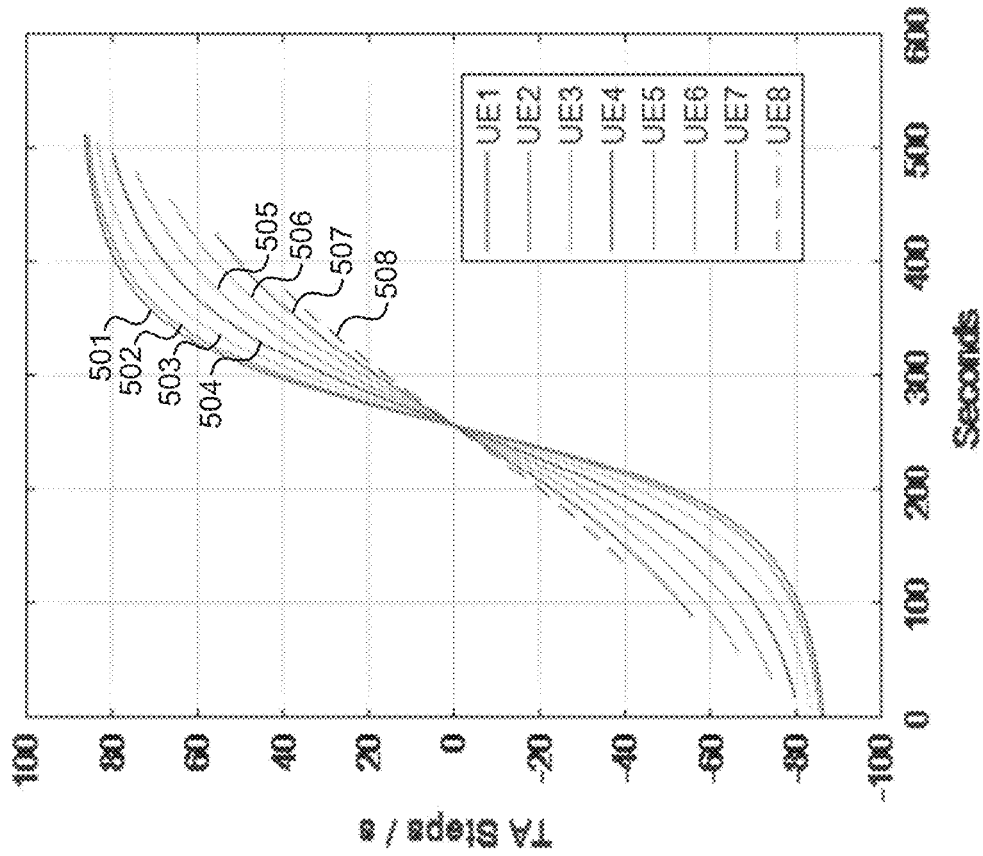
FIG. 5 shows an example embodiment of the subject matter described herein illustrating TA variation compensation function curves.
Figure 5:
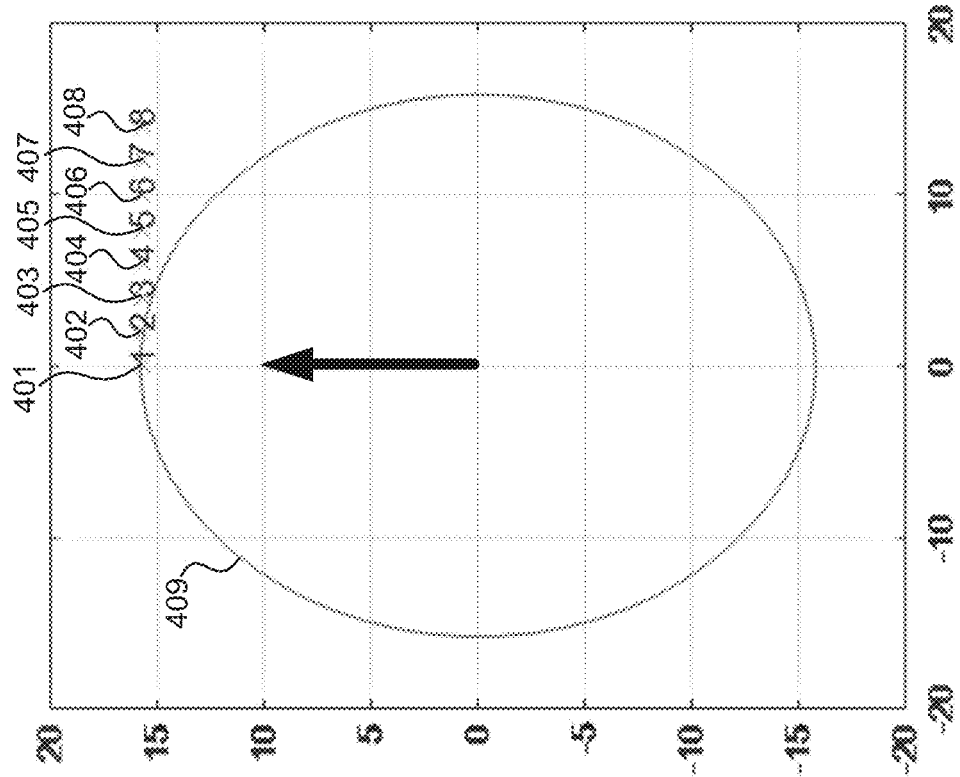

FIG. 5 illustrates example embodiments of TA variation compensation function curves 501-508 for various client device locations 401-408. The client device 200 can take advantage of the deterministic characteristic of the propagation delay as a function of the satellite movement. The left side of FIG. 5 illustrates a representation of the satellite coverage area 409, with the satellite moving toward eight static client devices 200 placed alongside a transversal axis. The right side of FIG. 5 illustrates the evolution over time of the curve 501-508 for the TA steps required within a second as the satellite moves.

The curve 501 may correspond to the client device position 401, the curve 502 may correspond to the client device position 402, the curve 503 may correspond to the client device position 403, the curve 504 may correspond to the client device position 404, the curve 505 may correspond to the client device position 405, the curve 506 may correspond to the client device position 406, the curve 507 may correspond to the client device position 407, and the curve 508 may correspond to the client device position 408.

The number of TA steps required within a second, f, may be proportional to the rate of change of the distance s between the network node device 210 and the client device 200:

$$f \propto \frac{ds}{dt}.$$

The distance s may be expressed using x and y components as $$s = \sqrt{x^2 + y^2}.$$

Therefore $$f \propto \frac{d}{dt}\sqrt{x^2 + y^2} = \frac{1}{2\sqrt{x^2 + y^2}}\left(2x\frac{dx}{dt} + 2y\frac{dy}{dt}\right).$$

In the coordinate system of FIG. 5, x is a constant for each client device position 401-408, and therefore dx/dt=0, and y=vt, where v is a constant velocity of the network node device 210 and t is time. Thus:

$$f \propto \frac{v^2 t}{\sqrt{x^2 + v^2 t^2}}.$$

This may correspond to the curves 501-508 in FIG. 5 as x is varied.

The curves 501-508 are illustrated in FIG. 5 for the time in which the client devices are within coverage range for the satellite. Thus, some curves are "shorter" than others. In this example, the curves are limited to approximately 500 seconds, given the largest time a client device can be reachable within coverage area for the moving satellite.

The curves 501-508 are deterministic. Therefore they can be interpolated by analytic functions, referred to as TA variation compensation function curves, TA drift curves, or TA curves herein. The TA variation compensation function curves can be pre-set/preconfigured in the network node device 210 and/or in the client device 200, e.g. by means of standardized function and its coefficients. Moreover, TA variation compensation function curves may be mirrored at both sides of the orbit and movement direction which can minimize the number of curves and the mapping effort required by the network node device 210 and/or by the client device 200.

FIGS. 6A-6H illustrate example embodiments of curves 501-508 and corresponding TA variation compensation function curves 501'-508'. The TA variation compensation function curves may be defined using, for example, a set of third degree polynomial functions, given by:

$$TA_{fix} = \text{sign}(u_{idx})[\alpha_{C_{idx}}|u_{idx}|^3 + \beta_{C_{idx}}|u_{idx}|^2 + \gamma_{C_{idx}}|u_{idx}| + \delta_{C_{idx}}],$$

where $TA_{fix}$ stands for the TA drift expected by the client device 200 at given instant in time; $\alpha$, $\beta$, $\gamma$, $\delta$ are the polynomial coefficients and are a function of the index $C_{idx}$. sign is the sign function. While $u_{idx}$ defines the index for the position along the polynomial curve, mapped in this example to be limited to the range:

$$u_{idx} = -127, -126, \ldots 0, 1, \ldots 128.$$

Figure 6A:
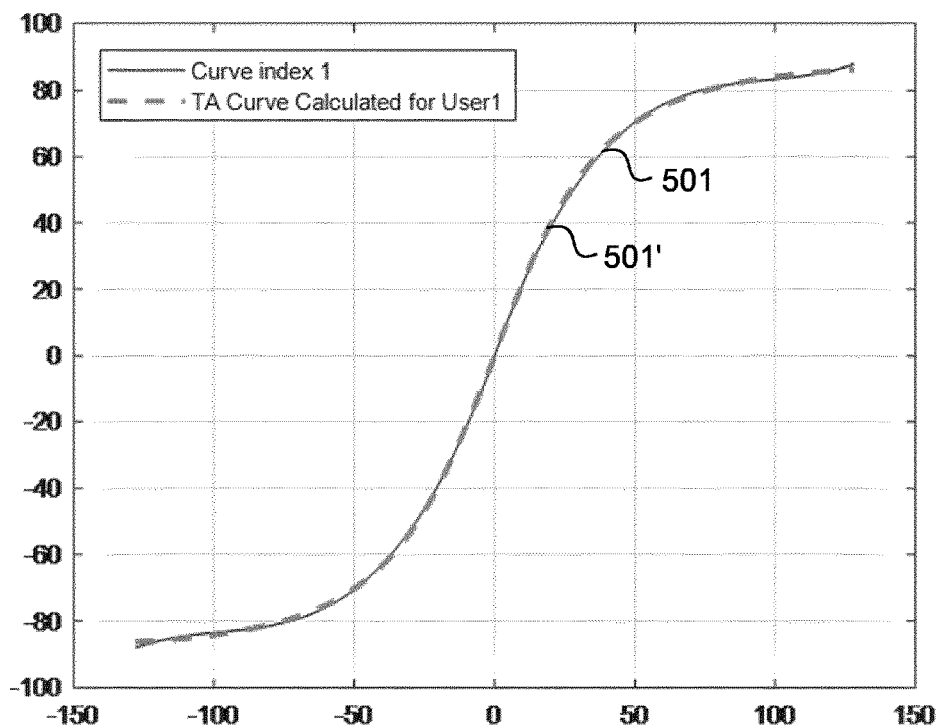
FIG. 6A-6H show an example embodiment of the subject matter described herein illustrating timing advance compensation functions.

The TA variation compensation function curve 501' of FIG. 6A may be represented by the following parameters:

$C_{idx}=0$; $\alpha=7.99*10^{-5}$; $\beta=-0.0235$; $\gamma=2.38\delta=0.1608$

Figure 6B:
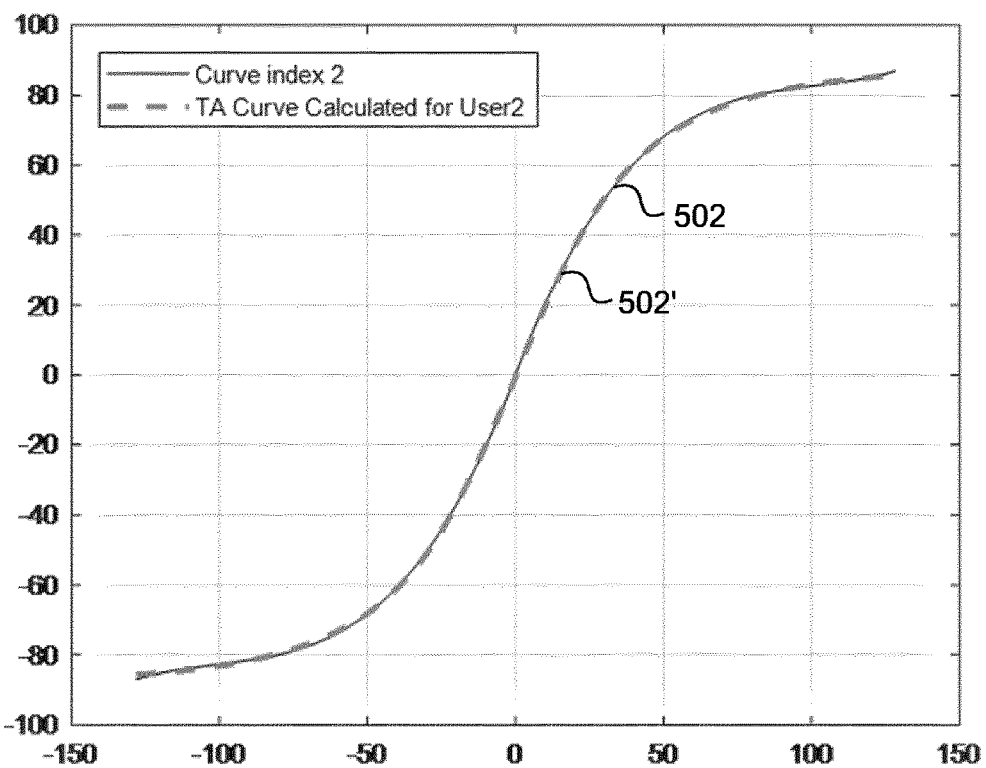

The TA variation compensation function curve 502' of FIG. 6B may be represented by the following parameters:

$C_{idx}=1$; $\alpha=6.77*10^{-5}$; $\beta=-0.0207$; $\gamma=2.21\delta=0.1834$

Figure 6C:
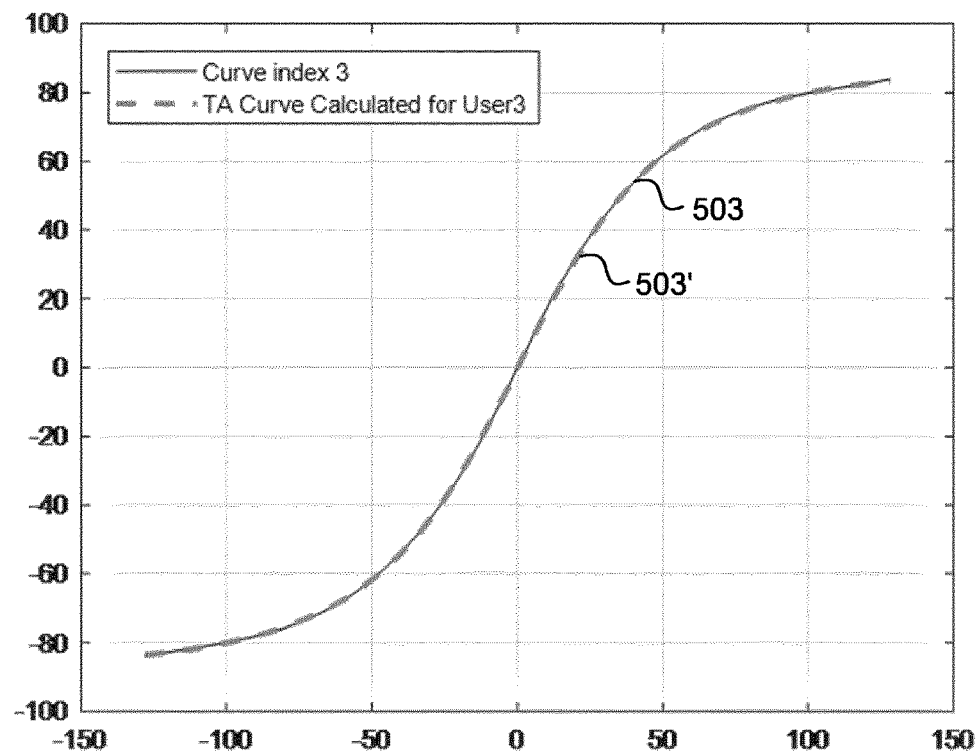
Figure 6D:
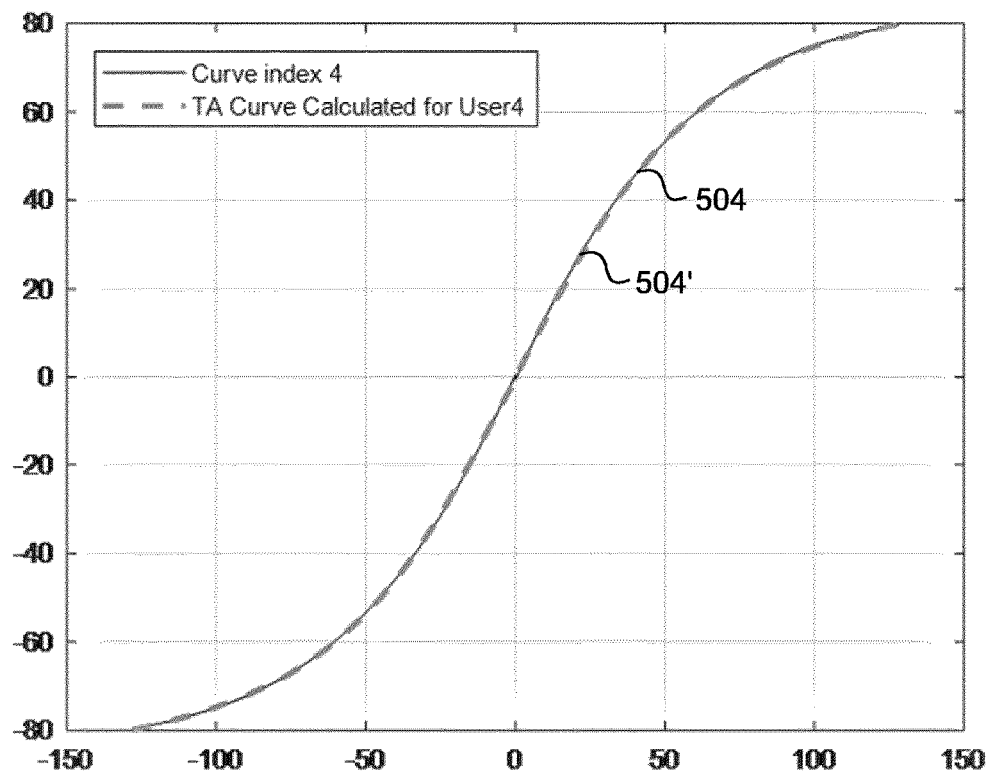
Figure 6E:
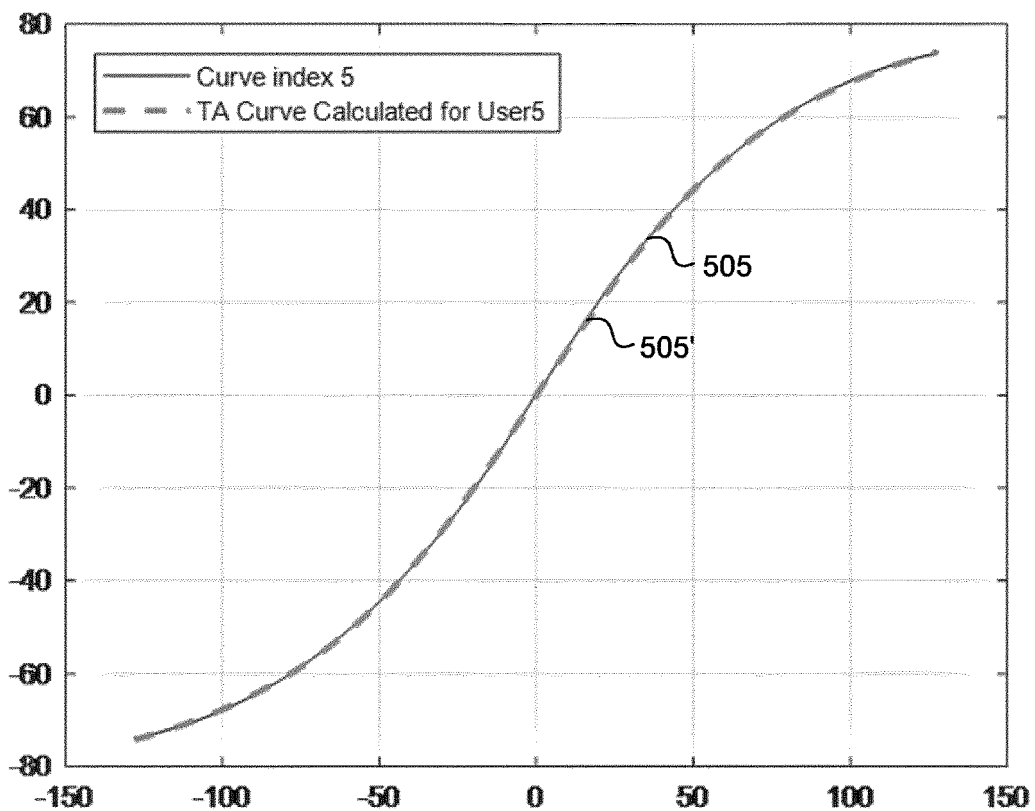
Figure 6F:
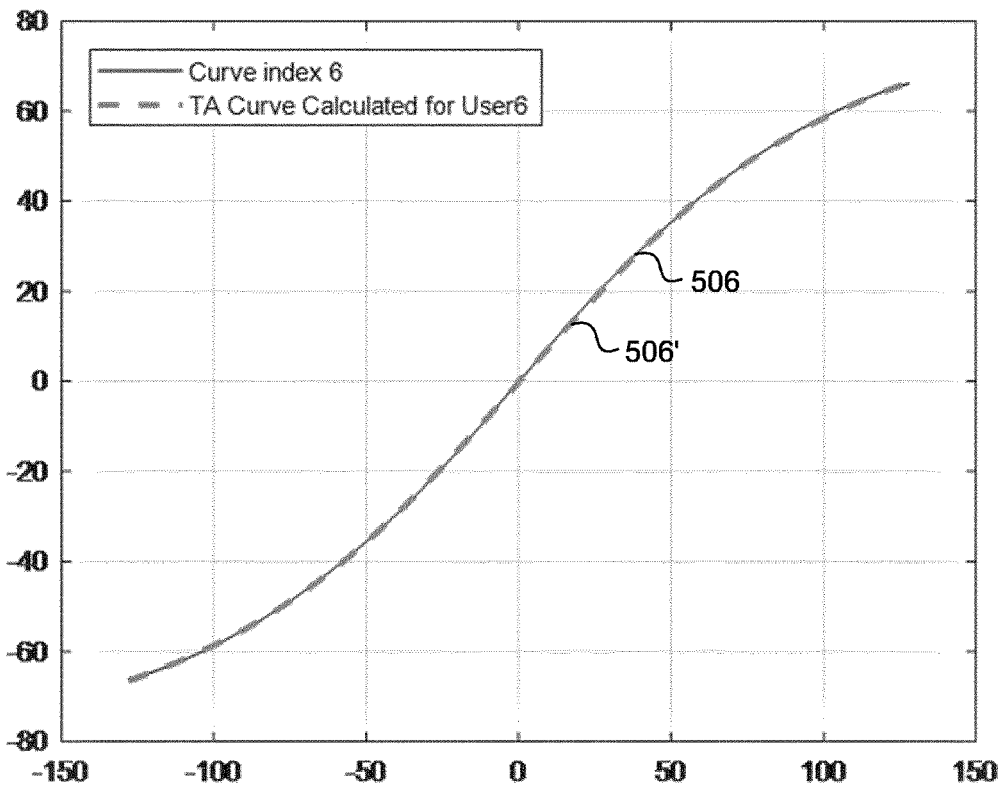
Figure 6G:
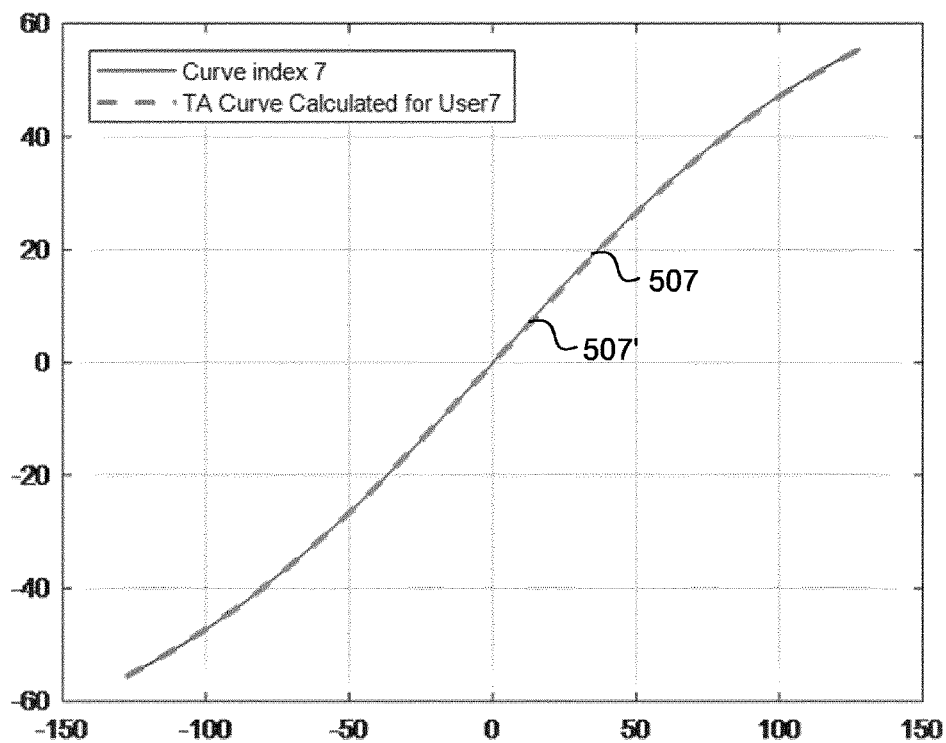
Figure 6H:
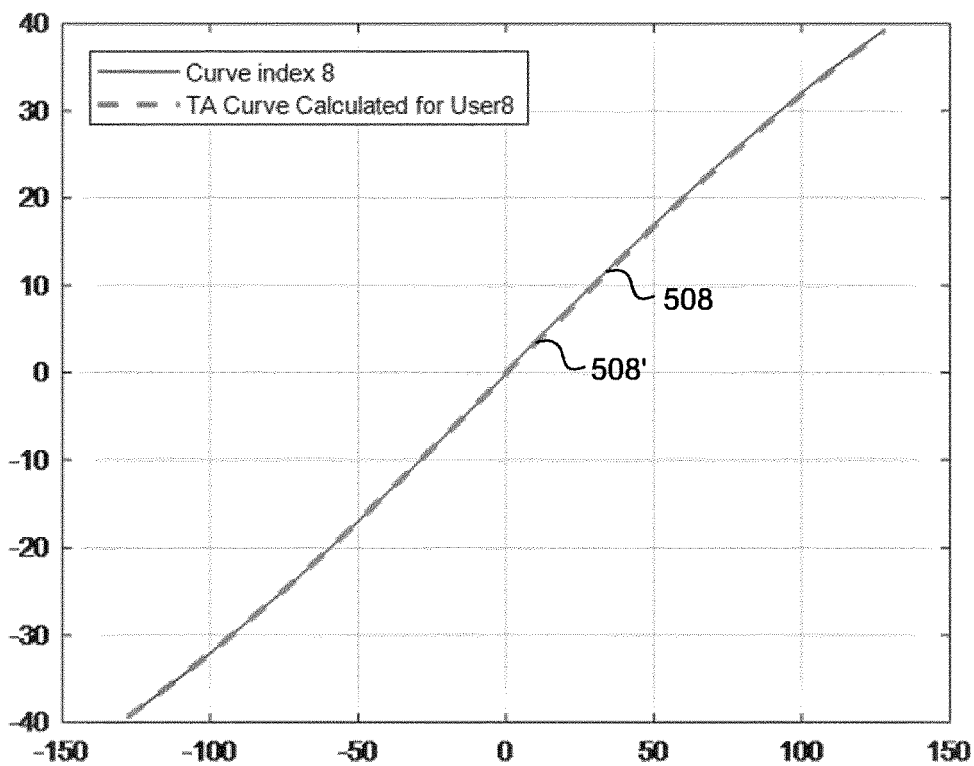

The TA variation compensation function curve 503' of FIG. 6C may be represented by the following parameters:

$C_{idx}=2$; $\alpha=4.13*10^{-5}$; $\beta=-0.0145$; $\gamma=1.83\delta=-0.5453$ The TA variation compensation function curve 504' of FIG. 6D may be represented by the following parameters:

$C_{idx}=3$; $\alpha=1.71*10^{-5}$; $\beta=-0.0082$; $\gamma=1.38\delta=-0.5975$ The TA variation compensation function curve 505' of FIG. 6E may be represented by the following parameters:

$C_{idx}=4$; $\alpha=2.80*10^{-6}$; $\beta=-0.0037$; $\gamma=0.9865\delta=-0.2902$ The TA variation compensation function curve 506' of FIG. 6F may be represented by the following parameters:

$C_{idx}=5$; $\alpha=-2.47*10^{-6}$; $\beta=-0.0012$; $\gamma=0.6695\delta=0.0057$ The TA variation compensation function curve 507' of FIG. 6G may be represented by the following parameters:

$C_{idx}=6$; $\alpha=-2.05*10^{-6}$; $\beta=0.0002$; $\gamma=0.4083\delta=0.1500$ The TA variation compensation function curve 508' of FIG. 6H may be represented by the following parameters:

$C_{idx}=7$; $\alpha=-2.08*10^{-8}$; $\beta=1*10^{-7}$; $\gamma=0.0695\delta=0.1643$ Following this definition, the table of FIG. 4 provides an example of a "dictionary" where predefined parameters for the polynomials can be stored. The dictionary can be shared between the network node device 210 and the client device 200, for example, by means of standardization. The network node device 210 may transmit a C_idx 320 to the client device. The client device 200 may deduce based on the received C_idx 320 the parameters intended by the network node device 210 and apply the correction to the TA.

Figure 7:
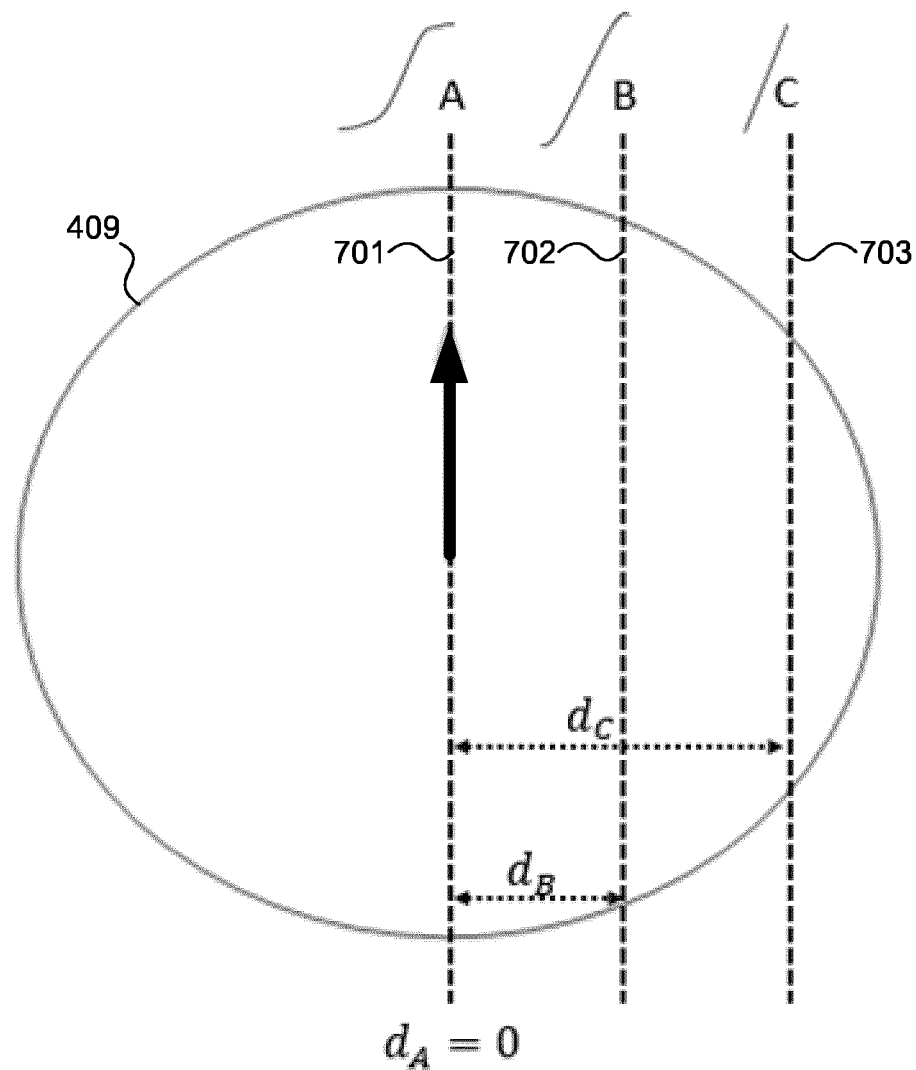
FIG. 7 shows an example embodiment of the subject matter described herein illustrating relative locations of the network node device and the client device.

FIG. 7 illustrates an example embodiment of relative locations of the network node device 210 and the client device 200.

The network node device 210 may transmit a cell-related index or 5G beam-related index to the client device 200. This index can be defined by how far the center of the 5G NR cell (or beam) is from the satellite/HAPS orbit line in a transverse axis. The index can represent a function curve from a predefined set. Three satellite/HAPS orbit lines 701-703 are illustrated in FIG. 7.

The index can also be related to a group of cells (those aligned in the vertical axis). The index can be conveyed, for example, in the cell broadcast messages, in the initial RAR response or initial RRC (re)configuration when setting the call, or in the RRC handover messages, preparing the client device 200 for pre-compensation in the target 5G NR cell (if outside the current group of cells).

Figure 8:
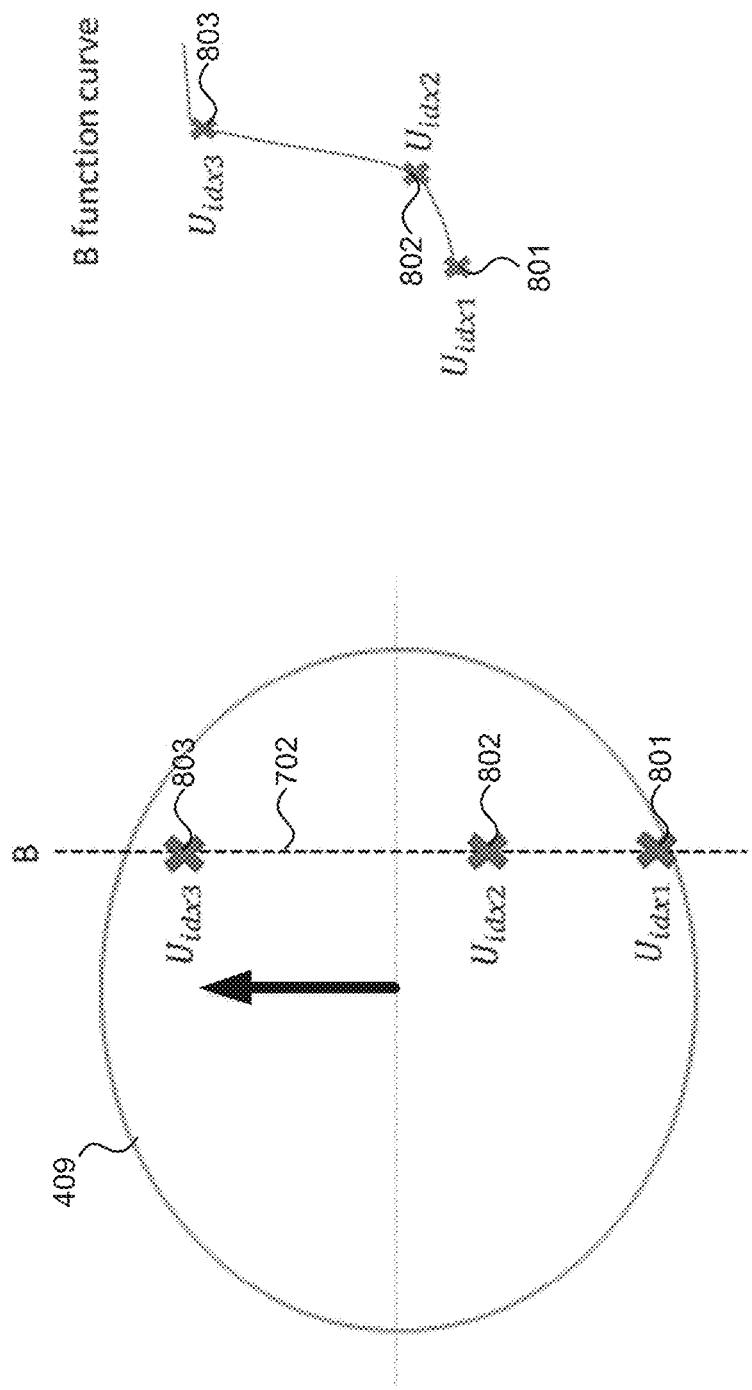
FIG. 8 shows an example embodiment of the subject matter described herein illustrating positions of the client device.

FIG. 8 illustrates an example embodiment of positions of the client device 200. Three positions 801-803 of the client device 200 along a satellite/HAPS orbit line 702 are illustrated in FIG. 8. Corresponding positions 801-803 are also illustrated on the TA variation compensation function curve.

The user-specific index may define in what position in the function curve the client device 200 is supposed to start the compensation of the TA drifts. It depends on the user relative position to the current satellite position in the axis parallel to the orbit. The user index may be conveyed based on client position information (for example GNSS position). Alternatively or additionally, the estimation of the user specific index may be taken from the cell beam position (vertical axis in FIG. 7. Alternatively or additionally, the estimation of the user specific index may be based on the past timing advance updates.

At least some of embodiments utilize a compensation applied by the client device 200 from the moment the information is received from the network node device 210. However, an alternative may be utilized, in which the network node device 210 applies a pre-compensation of the delay shift for processing and propagation delays. In this case, the network node device 210 may also signal the moment from which the compensation must be started by the client device 200. For example, if C_idx is indicated by DCI, then the subframe including DCI can be the time information of the start point. If C_idx is indicated by MAC and RRC, then the time information of the start point could be provided as well. This time information may be related to time, subframe ID, frame ID, subframe offset, or the like.

The mobility of client device 200 on the ground is usually negligible compared to the satellite moving speed. However, high-speed users, such as airplanes, may present fast variation on the time advance updates, especially if travelling parallel to the satellite/HAPS orbits. They may need to advance in the function curves more rapidly (or slowly depending on the direction) than regular users. The satellite can convey the time "scaling", which refines how fast the client device 200 should move in the function lines.

At least some of the embodiments described herein may minimize the number of Time Advance Update commands (MAC CE) required within a given period of time. Each Time Advance Update Command may correspond to just an octet (8-bits), but they need to be potentially sent dozens of times per second for each client device 200 in the network.

At least some of the embodiments may use n extra bits for the curve index (for $2^n$ curves in the predefined set, in the example provided in this document, n=3) and m extra bits for the local index inside a curve (8 bits for 256 allowed indexes). At the expense of a few more bits in the random access phase, at least some of the embodiments allow saving time advance update commands.

At least some of the embodiments may solve or mitigate the problem of initial RACH TA misalignment. This problem is caused by the fact the RAR TA information sent by the satellite arrives (and is used) at the client device 200 already out-of-date because of the fast changes in some points of the covered area and the large propagation delays.

For LEO satellites at 600 km of height, the client device and satellite can be e.g. as distant as 1932 km. The equivalent round-trip delay, therefore, can be as high as 12.8 ms for the regenerative payload and 25.7 ms transparent payload. In combination with the processing times, it means that from the moment the network node device 210 sends the TA command in the RAR until the client device 200 replies with a RRC connection request a few subframes later, the TA may have become out-of-date. At least some of the embodiments may solve this problem by presenting a "time advance" drift or variation compensation. It can minimize the handover recovering time, minimizing the time required for the TA adjustment in the target cell. Within the handover process, several messages may be exchanged between the client device 200 and the cells involved. In NTN scenarios, when the handover process is completed, the TA drift can be high enough to require a new TA process. This may be minimized by at least some of the embodiments.

The functionality described herein can be performed, at least in part, by one or more computer program product components such as software components. According to an embodiment, the client device 200 and/or network node device 210 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device for cellular communication, comprising:
   at least one processor; and
   at least one memory including computer program code;
   the at least one memory and the computer program code configured to, with the at least one processor, cause the client device to:
   receive, from a network node device communicating with the client device at least partially via an air/space born vehicle communication connection, an indication of a timing advance compensation function curve;
   access the indicated timing advance compensation function curve in a set of predetermined timing advance compensation function curves; and
   determine a timing advance variation compensation based on the accessed timing advance compensation function curve;
   wherein each timing advance compensation function curve in the set of predetermined timing advance compensation function curves has an associated unique index, and the indication of the selected timing advance compensation function curve comprises the index of the selected timing advance compensation function curve.

2. The client device according to claim 1, wherein the indication of the selected timing advance compensation function curve further comprises an indication of a starting point on the selected timing advance compensation function.

3. The client device according to claim 2, wherein the starting point on the selected timing advance compensation function is based on client position information, a cell beam position, or past timing advance variation compensations.

4. The client device according to claim 1, wherein the indication of the selected timing advance compensation function curve further comprises an indication of a start time instant for applying the selected timing advance compensation function curve.

5. The client device according to claim 1, wherein the indication of the selected timing advance compensation function curve further comprises an indication of a time period for updating one timing advance compensation function input step.

6. The client device according to claim 1, wherein the received indication of the selected timing advance compensation function curve is signaled from the network node device in a cell broadcast message, a random access response message, or a radio resource control message.

7. The client device according to claim 1, configured to store the set of predetermined timing advance compensation function curves.

8. A client device for cellular communication, comprising:
   at least one processor; and
   at least one memory including computer program code;
   the at least one memory and the computer program code configured to, with the at least one processor, cause the client device to:
   receive, from a network node device communicating with the client device at least partially via an air/space born vehicle communication connection, an indication of a timing advance compensation function curve;
   access the indicated timing advance compensation function curve in a set of predetermined timing advance compensation function curves; and
   determine a timing advance variation compensation based on the accessed timing advance compensation function curve;
   wherein the indication of the selected timing advance compensation function curve further comprises an indication of a timing advance compensation function input step size to use for the selected timing advance compensation function curve.

9. A client device for cellular communication, comprising:
   at least one processor; and
   at least one memory including computer program code;
   the at least one memory and the computer program code configured to, with the at least one processor, cause the client device to:
   receive, from a network node device communicating with the client device at least partially via an air/space born vehicle communication connection, an indication of a timing advance compensation function curve;
   access the indicated timing advance compensation function curve in a set of predetermined timing advance compensation function curves; and
   determine a timing advance variation compensation based on the accessed timing advance compensation function curve;
   wherein each timing advance compensation function used in the set of predetermined timing advance compensation function curves is a function of: an orbit of the air/space born vehicle communication connection, and a distance between a position area of the at least one client device and a beam trajectory of the air/space born vehicle communication connection on the ground.

* * * * *